US00RE50595E

(19) United States
(12) Reissued Patent
Seo et al.

(10) Patent Number: US RE50,595 E
(45) Date of Reissued Patent: *Sep. 23, 2025

(54) REFRIGERATOR

(71) Applicant: LG Electronics Inc., Seoul (KR)

(72) Inventors: Woonkyu Seo, Seoul (KR); Soonho Jung, Seoul (KR); Jinhee Park, Seoul (KR)

(73) Assignee: LG Electronics Inc., Seoul (KR)

( * ) Notice: This patent is subject to a terminal disclaimer.

(21) Appl. No.: 17/749,874

(22) Filed: May 20, 2022

Related U.S. Patent Documents

Reissue of:
(64) Patent No.: 10,677,521
Issued: Jun. 9, 2020
Appl. No.: 16/443,963
Filed: Jun. 18, 2019

U.S. Applications:
(63) Continuation of application No. 15/963,614, filed on Apr. 26, 2018, now Pat. No. 10,422,575, which is a
(Continued)

(30) Foreign Application Priority Data

Apr. 26, 2013 (KR) ..... 10-2013-0046832

(51) Int. Cl.
*F25D 27/00* (2006.01)
*A47F 3/00* (2006.01)
(Continued)

(52) U.S. Cl.
CPC ..... *F25D 27/005* (2013.01); *A47F 3/001* (2013.01); *A47F 3/043* (2013.01); *A47F 3/0434* (2013.01);
(Continued)

(58) Field of Classification Search
CPC ..... F25D 27/005; F25D 23/028; F25D 23/04; F25D 23/025; F25D 27/00; F25D 23/065;
(Continued)

(56) References Cited

U.S. PATENT DOCUMENTS 2,131,680 A 9/1938 Zahodiakin
4,072,486 A 2/1978 Joseph ..... A47F 3/043 62/131
(Continued)

FOREIGN PATENT DOCUMENTS

CN 10223713 11/2011
CN 102472555 5/2012
(Continued)

OTHER PUBLICATIONS

"Design excellence award for Gorenje Pininfarina Fridge Freezer," Internet Citation, Oct. 18, 2006, pp. 1-8, XP007905270, URL<http:www.gorenje.co.uk/ukpressreleases?id=6591&nid=624.
(Continued)

*Primary Examiner* — William C Doerrler
(74) *Attorney, Agent, or Firm* — Fish & Richardson P.C.

(57) ABSTRACT

There is disclosed a refrigerator; a lighting device provided in the storage chamber, a first door rotatably coupled to the case to open and close the storage chamber, an auxiliary storage chamber provided in the first door, a second door, a front panel formed of a transparent material, an evaporation treatment unit evaporated on an overall back surface of the front panel to transmit lights partially, a variable transparency film attached to a back surface of the evaporation treatment unit provided in the front panel to get transparent when the power is supplied, a frame unit with an opening having a corresponding size to an opening provided in the first door, an insulation panel distant from the front panel, a power supply unit for supplying an electric power to the variable transparency film and the lighting device, a proximity sensor provided in the second door to sense a user's approaching.

16 Claims, 6 Drawing Sheets

Related U.S. Application Data continuation of application No. 15/434,545, filed on Feb. 16, 2017, now Pat. No. 9,976,799, which is a continuation of application No. 14/784,340, filed as application No. PCT/KR2014/003509 on Apr. 22, 2014, now Pat. No. 9,696,085.

(51) Int. Cl.

| | |
|---|---|
| ***A47F 3/04*** | (2006.01) |
| ***F21V 14/00*** | (2018.01) |
| ***F21V 23/04*** | (2006.01) |
| ***F21V 33/00*** | (2006.01) |
| ***F21W 131/305*** | (2006.01) |
| ***F21Y 115/10*** | (2016.01) |
| ***F25D 11/02*** | (2006.01) |
| ***F25D 23/02*** | (2006.01) |
| ***F25D 23/04*** | (2006.01) |
| ***F25D 23/06*** | (2006.01) |
| ***F25D 29/00*** | (2006.01) |
| ***H05B 47/115*** | (2020.01) |

(52) U.S. Cl.

CPC ..... *A47F 3/0478* (2013.01); *F21V 14/003* (2013.01); *F21V 23/0442* (2013.01); *F21V 23/0471* (2013.01); *F21V 33/0044* (2013.01); *F25D 11/02* (2013.01); *F25D 23/02* (2013.01); *F25D 23/025* (2013.01); *F25D 23/028* (2013.01); *F25D 23/04* (2013.01); *F25D 23/065* (2013.01); *F25D 27/00* (2013.01); *F25D 29/005* (2013.01); *F21W 2131/305* (2013.01); *F21Y 2115/10* (2016.08); *F25D 2201/10* (2013.01); *F25D 2201/12* (2013.01); *F25D 2323/021* (2013.01); *F25D 2323/023* (2013.01); *F25D 2400/361* (2013.01); *F25D 2700/04* (2013.01); *H05B 47/115* (2020.01)

(58) Field of Classification Search

CPC ..... F25D 23/02; F25D 11/02; F25D 29/005; F25D 2323/021; F25D 2700/04; F25D 2323/023; F25D 2201/12; F25D 2201/10; F25D 2400/361; A47F 3/0434; A47F 3/043; A47F 3/0478; A47F 3/001; F21V 23/0442; F21V 14/003; F21V 23/0471; F21V 33/0044; F21Y 2115/10; H05B 47/115; F21W 2131/305

See application file for complete search history.

(56) References Cited

U.S. PATENT DOCUMENTS

| | | | | |
|---|---|---|---|---|
| 5,589,958 | A | 12/1996 | Lieb | |
| 5,909,950 | A | 6/1999 | Seok | |
| 6,059,420 | A | 5/2000 | Rogers | |
| 6,722,142 | B1 | 4/2004 | Pagel | F25D 29/00 62/131 |
| 8,567,976 | B2 | 10/2013 | Hamlin | |
| 9,642,214 | B2 | 5/2017 | Kendall | |
| 9,696,085 | B2 * | 7/2017 | Seo | F25D 11/02 |
| 9,976,799 | B2 * | 5/2018 | Seo | F25D 27/00 |
| 10,422,575 | B2 * | 9/2019 | Seo | A47F 3/0478 |
| 2009/0272136 | A1 * | 11/2009 | Knoll | F25D 27/00 62/251 |
| 2011/0108268 | A1 | 5/2011 | Chuprakov et al. | |
| 2011/0134627 | A1 | 6/2011 | Hamlin | F25D 27/00 362/249.05 |
| 2012/0286638 | A1 * | 11/2012 | Lee | A47F 3/0434 312/405 |
| 2013/0033163 | A1 | 2/2013 | Kang | |
| 2014/0078407 | A1 * | 3/2014 | Green | G09F 19/12 348/836 |
| 2014/0111118 | A1 | 4/2014 | Kendall | F25D 23/028 315/362 |
| 2014/0144083 | A1 * | 5/2014 | Artwohl | G09F 23/065 49/70 |
| 2014/0232958 | A1 | 8/2014 | Venturas | |
| 2015/0223618 | A1 | 8/2015 | Maasen | |
| 2015/0228253 | A1 | 8/2015 | Lee | |
| 2015/0245720 | A1 | 9/2015 | Isfort | |
| 2015/0276302 | A1 | 10/2015 | Roh | |
| 2016/0061514 | A1 | 3/2016 | Seo | |
| 2017/0108268 | A1 | 4/2017 | Seo | |
| 2017/0188721 | A1 | 7/2017 | Park | |
| 2017/0191744 | A1 | 7/2017 | Koo | |
| 2017/0191745 | A1 | 7/2017 | Choi | |
| 2017/0191746 | A1 | 7/2017 | Seo | |
| 2017/0191747 | A1 | 7/2017 | Seo | |
| 2017/0211874 | A1 | 7/2017 | Kim | |

FOREIGN PATENT DOCUMENTS

| | | |
|---|---|---|
| CN | 202350424 | 7/2012 |
| CN | 10293361 | 2/2013 |
| CN | 202734406 | 2/2013 |
| JP | H02213385 | 8/1990 |
| JP | H05106962 | 4/1993 |
| JP | 2005-331221 | 12/2005 |
| JP | 2009-270806 | 11/2009 |
| KR | 20-1996-0008835 | 3/1996 |
| KR | 2000-0034754 | 6/2000 |
| KR | 2006-116349 | 11/2006 |
| KR | 2011-089534 | 8/2011 |
| KR | 2011-089535 | 8/2011 |
| WO | WO 2011/093614 | 8/2011 |

OTHER PUBLICATIONS

International Search Report dated Aug. 22, 2014 for Application No. PCT/KR2014/003509, 2 pages.

Chinese Office Action issued in Application No. 201480023720.8 dated Aug. 12, 2016, 11 pages.

Extended European Search Report issued in European Application No. 14788516.4 dated Oct. 27, 2016, 9 pages.

Chinese Office Action in Chinese Application No. 201480023720.8 dated Apr. 7, 2017, 12 pages.

U.S. Office Action issued in U.S. Appl. No. 15/466,606, dated May 12, 2017, 9 pages.

U.S. Office Action issued in U.S. Appl. No. 15/434,525, dated Sep. 13, 2017, 10 pages.

U.S. Office Action issued in U.S. Appl. No. 15/434,545, dated Sep. 14, 2017, 10 pages.

U.S. Office Action issued in U.S. Appl. No. 15/963,614 dated Jan. 30, 2019.

U.S. Notice of Allowance issued in U.S. Appl. No. 15/963,614 dated May 15, 2019.

* cited by examiner

REFRIGERATOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a *reissue of U.S. application Ser. No. 16/443,963, filed on Jun. 18, 2019, now U.S. Pat. No. 10,677,521, issued on Jun. 9, 2020, which is a* continuation of U.S. application Ser. No. 15/963,614, filed on Apr. 26, 2018, *now U.S. Pat. No. 10,422,575,* which is a continuation of Ser. No. 15/434,545, filed Feb. 16, 2017, now U.S. Pat. No. 9,976,799, which is a continuation of U.S. application Ser. No. 14/784,340, filed Oct. 14, 2015, now U.S. Pat. No. 9,696,085, which is a U.S. National Phase application under 35 U.S.C. § 371 of International Application PCT/KR2014/003509 filed on Apr. 22, 2014, which claims the benefit of Korean Application No. 10-2013-0046832, filed on Apr. 26, 2013, the entire contents of the applications are hereby incorporated by reference.

BACKGROUND

1. Field

Embodiments of the present disclosure relate to a refrigerator, more particularly, to a refrigerator having a door which is partially and selectively transparent to allow a user to see a storage chamber.

2. Background

Generally, a refrigerator exhausts the cold air generated by a freezing cycle configured of a compressor, a condenser, an expansion valve and an evaporator and lowers a temperature therein only to freeze or refrigerate foods.

Such a refrigerator typically includes a refrigerator compartment in which foods or beverages are preserved in a frozen state and a refrigerator compartment in which the foods or beverages are preserved fresh.

The refrigerator may be classified into a top mount type having a freezer compartment mounted on a top thereof, a bottom freezer type having a freezer compartment mounted under a refrigerator compartment, and a side by side type having freezer and refrigerator compartments arranged side by side.

Recently, the original function of freezing or refrigerating the foods is diversified. In other words, a dispenser is installed in a door of the refrigerator to provide purified water and ice and a display is installed in a front of the door to show a state of the refrigerator and to manage the refrigerator.

However, the door is fabricated opaque and coupled to a storage chamber of a case to open and close the storage chamber. Before opening the door, the user cannot to figure out the kinds and locations of the foods stored in the storage chamber.

In the refrigerator, cold air loss occurs when the user opens and closes the door. The cold air inside the storage chamber is leaked outside if the door is open and closed frequently and the temperature inside the storage chamber rises. Accordingly, there is a disadvantage of high power consumption used in lowering the temperature inside the storage chamber.

DISCLOSURE OF INVENTION

Technical Problem

To overcome the disadvantages, an object of the present disclosure is to provide a refrigerator having a door which is partially and selectively transparent to allow a user to see a storage chamber.

Solution to Problem

To achieve these objects and other advantages and in accordance with the purpose of the embodiments, as embodied and broadly described herein, a refrigerator includes a case having a storage chamber provided therein; a lighting device provided in the storage chamber to light an inner space of the storage chamber; a first door rotatably coupled to the case to open and close the storage chamber; an auxiliary storage chamber provided in the first door to define a storage space, the auxiliary storage chamber accessible through an opening formed in the first door; a second door rotatably coupled to the first door in the same direction as the first door; a front panel attached to a front surface of the second door, the front panel formed of a transparent material; an evaporation treatment unit evaporated on an overall back surface of the front panel to transmit lights partially; a variable transparency film attached to a back surface of the evaporation treatment unit provided in the front panel to get transparent when the power is supplied; a frame unit of the second door on which the front panel is mounted, with an opening having a corresponding size to the opening provided in the first door; an insulation panel provided in the frame unit of the second door, distant from the front panel; a power supply unit for supplying an electric power to the variable transparency film and the lighting device; a proximity sensor provided in the second door to sense a user's approaching; and a control unit for controlling the power supply unit to simultaneously operate the variable transparency film and the lighting device based on a sensing signal of the proximity sensor.

The control unit may increase the amount of the electric currents supplied to the variable transparency film, as the user approaches the refrigerator.

The control unit may increase the amount of the electric currents supplied to the first lighting device, as the user approaches the refrigerator.

The refrigerator may further include a second lighting device provided in the first door.

The control unit may increase the amount of the electric currents supplied to the second lighting device as the user approaches the refrigerator.

The second lighting device may include a printed circuit board mounted in a groove formed in an inner surface of the first door; a plurality of LED arranged on the printed circuit board vertically; and a transparent cover member for covering the groove.

A size of the variable transparency film may be corresponding to a size of the opening formed in the second door.

The front panel may be formed of a tempered glass material.

The insulation panel may include a first glass panel arranged behind the variable transparency film; and a second glass panel spaced apart a predetermined distance from a back surface of the first glass panel to define an insulation space between the first glass panel and the second glass panel.

The insulation panel may further include a sealing member provided between an edge portion of the first glass panel and an edge portion of the second glass panel, wherein the insulation panel is coupled to the second door after an insulation space is formed by the first glass panel, the second glass panel and the sealing member assembled to each other.

At least one of air, argon and krypton may be injected into the insulation space.

The insulation space may be a vacuum space.

The refrigerator may further include a latch device mounted in the first door; a hook member projected from a back surface of the second door to be selectively coupled to the latch device; and a latch unlocking device for selectively unlocking the coupling between the latch device and the hook member.

Advantageous Effects of Invention

According to at least one embodiment of the disclosure, the door for opening and closing the storage chamber of the refrigerator is partially transparent and the inner space of the storage chamber provided in the refrigerator may be visible even unless the door is open.

Furthermore, the door may be automatically transparent and the lighting device is automatically operated when it is sensed that the user approaches the refrigerator door.

Still further, the door looks the same color or design as the other region of the refrigerator even in an opaque state, such that the variable transparency unit of the door may not be distinguished from a neighboring region. Accordingly, a clean and neat exterior appearance can be realized.

BRIEF DESCRIPTION OF THE DRAWINGS

Embodiments will be described in detail with reference to the following drawings in which like reference numerals refer to like elements, and wherein.

DETAILED DESCRIPTION

Hereinafter, exemplary embodiments of the disclosure will be described in detail, referring to the accompanying drawings.

Figure 1:
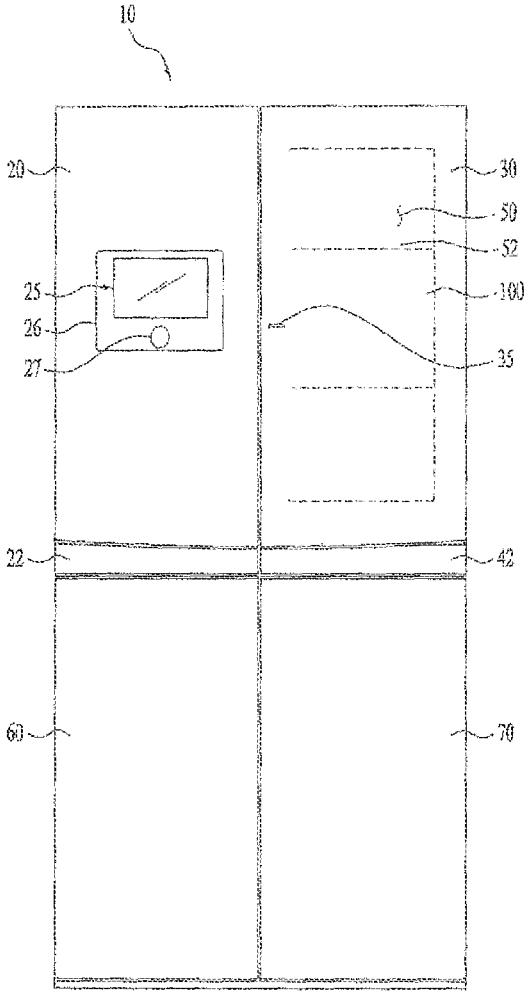
FIG. 1 is a front view illustrating a refrigerator according to exemplary embodiments of the disclosure.

A refrigerator shown in FIG. 1 is a bottom freezer type having a refrigerator compartment mounted in a top portion of a case 10 and a freezer compartment mounted in a lower portion of the case.

The present disclosure is not limited to such a bottom freezer type refrigerator and it may be applicable to any refrigerators having a door for opening and closing a storage chamber thereof.

In one embodiment, a left refrigerator door 20 and a right refrigerator door 30 are rotatably coupled to the refrigerator compartment. One door may be rotatably coupled to the refrigerator compartment as the refrigerator door.

A door for opening and closing the freezer compartment includes a left freezer door 60 and a right freezer door 70. One rotatable door or a drawer type door retractable forward and backward may be provided as the freezer door.

Concave portions 22 and 42 for door handles may be formed under the refrigerator doors 20 and 30, respectively. A handle recess (not shown) may be formed in an upper surface of each freezer door 60 and 70.

Figure 3:
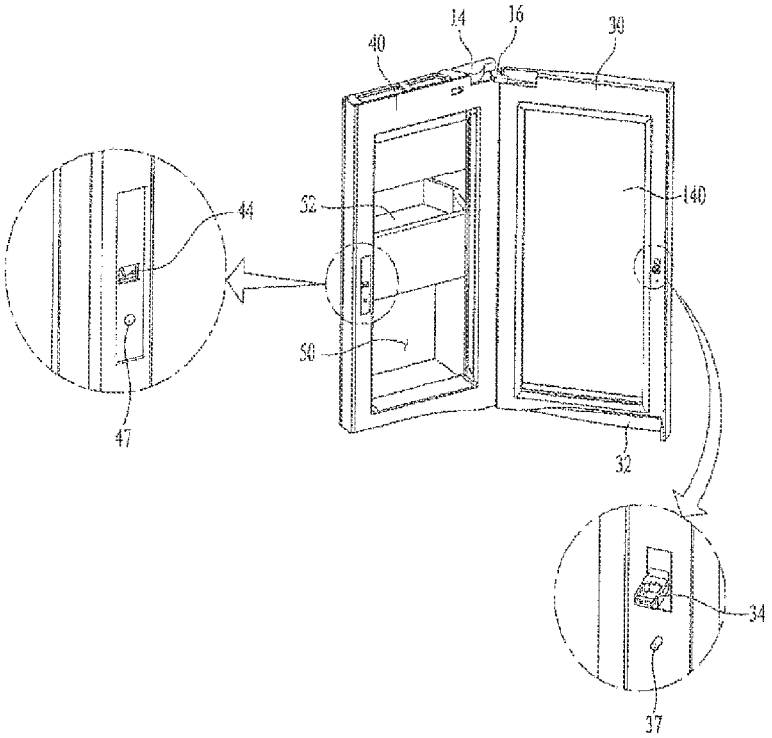
FIG. 3 is a perspective diagram illustrating a state of a second door of the right refrigerator door which is open with respect to a first door.

Referring to FIG. 3, a handle recess 32 is formed in a lower back surface of the right refrigerator door 30.

Handles of the door may be projected from surfaces of the doors. However, for a clean and neat exterior, it is preferred that handles are not exposed to the front surfaces as shown in the embodiment.

A display 25 may be provided in the front surface of the left refrigerator door 20. The display 125 may be provided in the left refrigerator door 20 and it may be provided in the right refrigerator door 30.

The display 25 may be mounted to a back surface of a transparent panel attached to the front surface of the door.

Lighting units 26 and 27 may be further provided adjacent to the display 25 and they may be configured of LED modules. The lighting units 26 and 27 may realize different colors, respectively.

Meanwhile, the right refrigerator door 30 may include a variable transparency unit 100 provided in a central region, except an edge region. The variable transparency unit 100 may be selectively transparent.

The variable transparency unit 100 may be provided in either of the refrigerator door and freezer doors. In case the refrigerator includes a plurality of doors, the variable transparency unit 100 may not be provided in the portion where the display or dispenser is arranged. It is preferred that the variable transparency unit is provided in a door opened most frequently.

Figure 2:
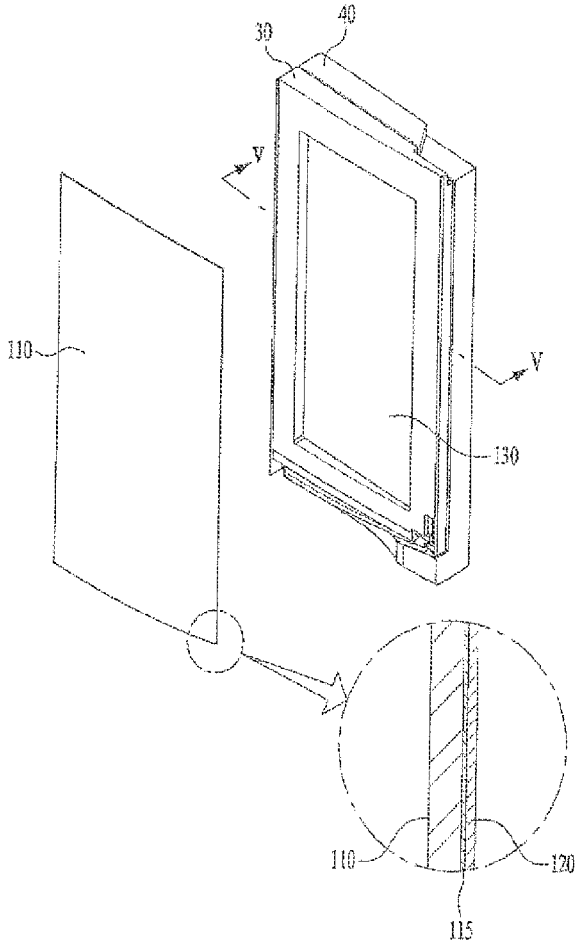
FIG. 2 is an exploded perspective diagram of a right refrigerator door.

As shown in FIG. 2, the right refrigerator door may include a first door 40 rotatable on the case 10 to open and close the refrigerator compartment and a second door 30 rotatable with respect to the first door.

A portion which will be visible when the variable transparency unit 100 shown in FIG. 1 is put into operation is an auxiliary storage chamber 50 provided in the first door 40, not the refrigerator compartment, and that will be described later.

Meanwhile, the first door 40 is closable with respect to the case 10 and it may include a door dike projected along both sides thereof, a door basket projected from an inner surface of the door dike and a plurality of coupling projections (45, see FIG. 5) for coupling a door shelf 52.

A plurality of door baskets or shelves 52 may be arranged in the first door 40 and a storage space formed by the plurality of the door baskets or shelves 52 may define the auxiliary storage chamber 50.

In case a rear wall is formed of a transparent material or an opening, not only an inner space of the auxiliary storage chamber 50 but also an inner space of the refrigerator compartment may be seen through the variable transparency unit 100.

A numeral reference 35 with no description shown in FIG. 1 is a latch unlocking button for selectively unlocking the coupling between the first door 40 and the second door 30, which will be described later.

When the doors are open, the refrigerator compartment and the freezer compartments typically includes lighting devices (190, see FIG. 7), respectively, to lighten the inner space of the compartments bright.

Generally, a door switch (not shown) is provided in a front surface of the case 10. The lighting device 190 is switched on when the door is open and switched off when the door is closed.

As it will be described later, the lighting device 190 may be controlled to be switched on simultaneously even the variable transparency unit 100 is put into operation as well as when the door is open. Accordingly, the inner spaces of the refrigerator or freezer compartment lightened by the lighting device 190 may be seen well through the variable transparency unit 100.

The door shown in FIG. 2 may include a first door 40 rotatably coupled to a right refrigerator portion of the case 10 and a second door 30 rotatably coupled to the first door 40.

However, the embodiments of the present disclosure are not limited to the door having such a door-in-door structure and they can be applied to one door.

When the variable transparency unit 100 is provided in one door, the refrigerator compartment inside one door can be seen through the variable transparency unit 100.

As shown in FIG. 3, the first door 40 may be coupled to the case 10 by a first hinge 14 fixedly coupled to the case 10. The second door 30 may be coupled to the first door 40 by a second hinge 16 coupled to the first door 40.

As shown in FIG. 2, a front panel 110 formed of a transparent material may be disposed to a front surface of the second door 30.

The front panel 110 has to define a front surface of the door and be transparent, such that it may be formed of tempered glass.

The front panel 110 can be formed of transparent plastic. However, plastic having low hardness is typically subject to scratches and it is preferred that the front panel 110 is formed of tempered glass having good hardness and transparency.

A printed layer having a predetermined color and image may be partially formed in a front surface of the front panel 110.

The printed layer may have a design for decorating a front surface of the door and show a location of a specific logo or function button.

The front panel 110 may include an evaporation treatment portion 115 provided in a back surface thereof, with evaporation treatment to transmit light partially.

The evaporation treatment portion 115 may be formed by an evaporation process. In the evaporation process, a metallic material or metallic oxide source is heated, dissolved and evaporated to evaporate the source, using a high temperature heat.

The evaporation process uses the principle that the metal evaporated after heated at a high temperature in a short time period will spring forth and be attached to a low temperature mother material to form a thin metallic film.

In the evaporation process, an electron beam may be provided as evaporation means. Multilayered metal or metallic oxide material is heated, dissolved and evaporated to form a thin film on a surface of the mother material, using the electron beam.

In case the evaporation process is performed in the air, the metallic material could be oxidized at a high temperature. To prevent the high temperature oxidization, the metallic evaporation may be performed in a vacuum state.

The metallic material is evaporated in the vacuum state and that can be called "vacuum evaporation".

Meanwhile, sputtering may be performed for deposition treatment on the glass material 111.

In the sputtering process, plasma is generated by a high voltage created by a voltage generation device and the plasma ion is collided against a target to deposit a metallic atom to a surface of a mother material, in other words, the glass material 111 to form a metallic film.

It is preferred that the evaporation treatment portion 115 is evaporated on an overall region of the back surface possessed by the front panel 110.

The evaporation treatment portion 115 may have a color which can be differentiated by the evaporated metallic material or metallic oxide.

A variable transparency film 120 may be deposited on the back surface of the front panel 110 having the evaporation treatment portion 115 formed therein. The variable transparency film 120 is transparent, when the power is supplied.

The variable transparency film 120 is a special film changed into a transparent state from an opaque state when a voltage is applied thereto.

Specifically, liquid crystal and polymer are combined with each other and coated on two conductive films, to form the variable transparency film.

In a state where a voltage is not applied, bar-shaped molecule liquid crystal are arranged along an inner wall of a capsule. At this time, the light incident on the variable transparency film 120 cannot go straight because of a difference between a refraction index of the polymer and a refraction index of the liquid crystal and of double refraction of the liquid crystal, only to be dispersed to look opaque.

When the voltage is applied, the liquid crystal molecules are arranged in a vertical direction with respect to the electron because of the characteristic that the liquid crystal molecules are arranged in parallel with the direction in which the voltage is applied. At this time, if the refraction index of the liquid crystal is equal to the refraction index of the polymer, it is likely that there is no interface of the capsule and the lights go straight, without being dispersed, such that the variable transparency film 120 can be transparent.

The evaporation treatment portion 115 is evaporated on the overall back surface of the front panel 110. In contrast, the variable transparency film 120 may be attached to the back surface of the front panel 110, with a smaller size than the front panel 110.

When the variable transparency film 120 is transparent after the power is supplied, the variable transparency unit 100 transmits the lights of the lighting device via the evaporation treatment portion 115 to make the inner space of the auxiliary chamber 50 visible.

When the variable transparency film 120 is opaque, the lights cannot transmit the variable transparency film 120 and the variable transparency film 120 looks black. Also, the color of the evaporation treatment portion 115 in front of the variable transparency film 120 is seen.

When the power is not supplied to the variable transparency film 120, the variable transparency film 120 looks black and it is preferred that a black metallic material or metallic oxide is evaporated on the evaporation treatment portion 115.

When the variable transparency film 120 is not put into operation, the front panel 110 may conceal an outline of the variable transparency unit 100 to look the exterior appearance clean and neat.

Figure 4:
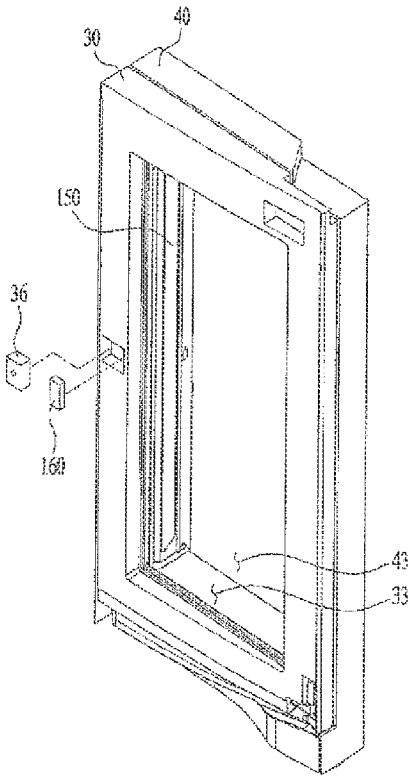
FIG. 4 is a perspective diagram schematically illustrating the door of FIG. 2, without an insulation panel provided in the door of FIG. 2.

As shown in FIG. 4, holes 43 and 33 may be formed in central portions of the second door 30 and the first door 40, respectively.

The front panel 110 may be attached to a front surface of the second door, in a state where the variable transparency film 120 is attached to the back surface of the front panel 110.

As mentioned above, the front panel 110 includes the evaporation treatment portion 115 provided in the back surface thereof and the variable transparency film 120 is attached to a surface of the evaporation treated portion 115.

It is preferred that the variable transparency film 120 is attached to the front panel by a transparent adhesive.

Moreover, even when the front panel 110 having the variable transparency film 120 attached thereto is attached to the front surface of the second door 30, the transparent adhesive may be used.

The front panel is transparent and the variable transparency film 120 is also selectively transparent. Accordingly, an attached surface is seen outside and it is preferred that the adhesive is not seen.

The hole 33 of the second door 30 is closed airtight by an insulation panel 130.

Generally, the door includes an outer case for defining a front frame and an inner liner for defining a back surface of the door and an insulation material filled in a space formed between the outer case and the inner liner.

The second door 30 may also have the same structure and an opaque insulation material cannot be filled in the hole 33 formed in the central portion of the second door 30 for insulation.

Accordingly, it is preferred that an insulation panel 130 is arranged in the hole 33 of the second door 30 for the insulation, without the insulation material filled in the hole 33.

A material of the insulation panel 130 and an arrangement structure of the insulation panel 130 will be described in detail later.

Figure 5:
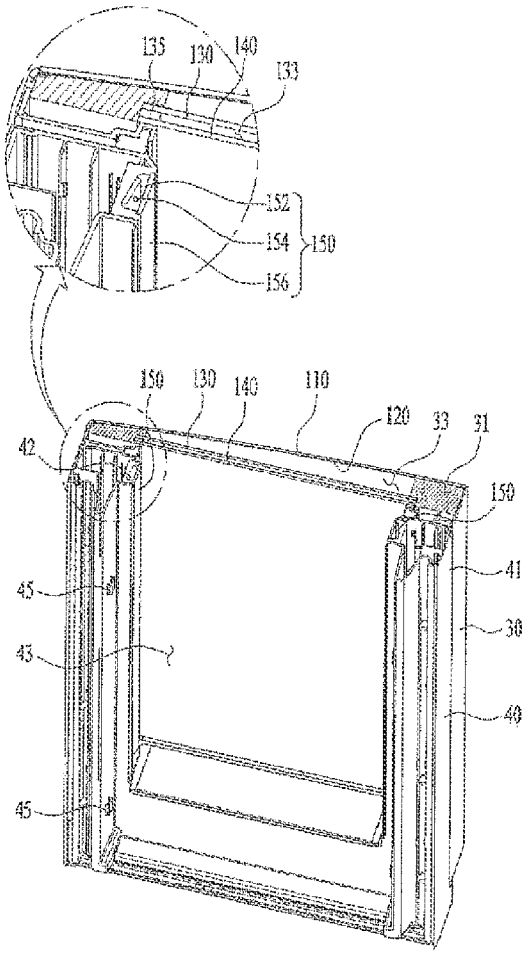
FIG. 5 is a perspective diagram of FIG. 2, cut away along V-V line.
Figure 6:
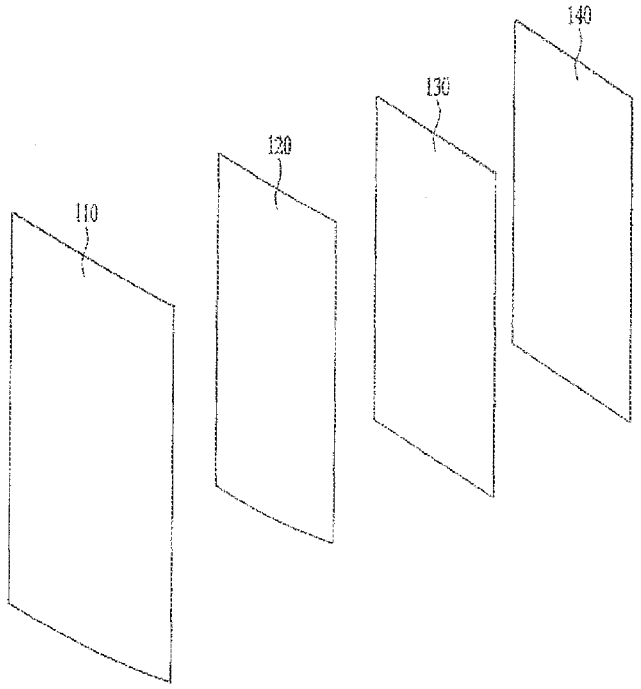
FIG. 6 is a perspective diagram illustrating a front panel, a variable transparency film and an insulation panel separated from each other.

Referring to FIGS. 4 through 6, a structure of a door according to exemplary embodiments of the disclosure will be described in detail.

FIG. 4 illustrates the hole of the door shown in FIG. 2, without the insulation panel provided in the hole.

First of all, the holes 33 and 43 are serially formed in the central portions of the second door 30 and the first door 40, respectively.

In other words, the second door 30 includes a frame unit 31 having the hole 33 formed therein. The first door 40 includes a frame unit 41 having the hole 33 formed therein.

The evaporation treatment portion 115 is formed in a front surface of the frame unit 31 provided in the second door 30, with the hole 33 formed therein, and the front panel 110 having the variable transparency film 120 attached thereto is attached to the frame unit 31.

The hole 33 of the second door 30 is formed in the frame unit 41 formed in an approximately rectangular panel shape and the hole 33 is also formed in a rectangular shape.

As shown in FIG. 5, one or more insulation panels 130 and 140 are provided in the hole 33 of the second door 30, distant from the front panel 110.

The one or more insulation panels 130 and 140 may define an insulation space filled with air and the insulation space is formed between the insulation panels 130 and 140 and the front panel 110.

The insulation panels are spaced apart a predetermined distance from each other and two glass panels 130 and 140 may be provided to form an insulation space 133 between the insulation panels.

The two glass panels 130 and 140 may include a first glass panel 130 arranged behind the front panel 110 having the variable transparency film 120 attached thereto, and a second glass panel 140 spaced apart a predetermined distance from the first glass panel 130 to form the insulation space 133, together with the first glass panel.

When the variable transparency film 120 is getting transparent, the auxiliary storage chamber behind has to be seen through the insulation panels 130 and 140. Accordingly, the insulation panels 130 and 140 may be also formed of a transparent material.

Especially, the second glass panel 140 is exposed outside, when the user opens the sub door 30, and it is preferred that the second glass panel 140 is formed of tempered glass.

A sealing member 135 is coupled between the first glass panel 130 and the second glass panel 140 along each edge portion, to close an inner space airtight.

At least one of the air, argon and krypton may be injected into the insulation space 133.

It is preferred that the gas injected into the insulation space 133 is colorless, with a good insulation performance.

Moreover, the insulation space 133 may be a vacuum space.

To make the insulation space 133 vacuum, an insulation panel assembly having the first glass panel 130, the second glass panel 140 and the sealing member 135 has to be coupled to keep a high strength.

The sealing member 135 is arranged between the two glass panels 130 and 140 to make the assembly. The gas is injected into the inner space of the assembly or the air is exhausted from the inner space of the assembly, only to make the vacuum state.

Once the insulation panel assembly is fabricated, the fabricated assembly may be mounted in the frame unit 31 of the second door 30.

Figure 7:
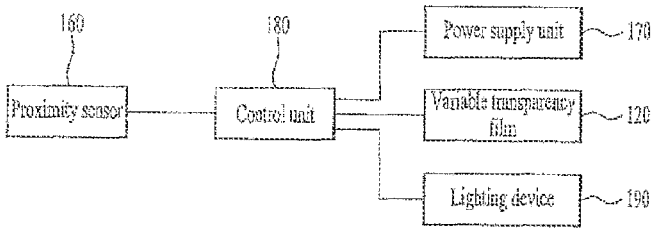
FIG. 7 is a block diagram illustrating a control unit and key parts related to the control unit according to exemplary embodiments of the disclosure.

Meanwhile, as shown in FIG. 7, a power supply unit 170 may be provided in the case 9 to provide the power to the variable transparency film 120 and the lighting device 190.

The variable transparency film 120 is attached to the back surface of the front panel 110 of the second door and the power supply unit 170 may supply the power through a wire connected by a second hinge 16.

As shown in FIG. 4, it is preferred that a proximity sensor 160 is provided in a predetermined portion of the second door 30.

The variable transparency film 120 and the lighting device 190 may be put into operation manually, when the user pushes an operation button or it may be put into operation automatically when the proximity sensor 160 senses the user's approaching.

The proximity sensor 160 may sense change of capacitance when the user approaches the refrigerator door.

The proximity sensor 160 is configurated to sense the user approaching in a preset distance. Alternatively, the proximity sensor 160 may sense that a sensing signal is getting stronger as the user is getting closer to the door and supply the power to the variable transparency film 120 and the lighting device 190 to operate them.

As shown in FIG. 7, a control unit 180 may control the power supply unit 170 to operate the variable transparency film 120 and the lighting device 190 simultaneously based on the sensing signal of the proximity sensor 160.

The variable transparency film 120 is getting transparent when provided with the power and the power supply unit is connected to the variable transparency film 120 to supply the power.

The lighting device 190 provided in the storage chamber of the refrigerator is controlled to be switched on when the door is open and when the power is supplied to the variable transparency film 120 simultaneously.

In other words, when the variable transparency film 120 is operated to get transparent, the power is also supplied and operated to the lighting device 190 simultaneously, regardless of the door opening.

The control unit 180 may increase the electric currents supplied to the variable transparency film 120 and the lighting device 190, as the user is approaching the refrigerator.

The control unit determines change in the intensity of the sensing signal transmitted to the proximity sensor 160. When the user is getting closer to the door, the power supply unit 170 may increase the power supplied to the variable transparency film 120 and the lighting device 190 gradually.

Hence, a transparency level of the variable transparency film 120 is gradually getting higher in an opaque state and a brightness level of the lighting device 190 is getting higher.

Also, the proximity sensor 160 may sense that the user is getting farther from the refrigerator and the control unit 180 may reduce the power supplied to the variable transparency film 120 and the lighting device 190 gradually.

In other words, the control unit 180 may gradually change the transparency of the variable transparency film 120 or the brightness of the lighting device 190 to show a dimming effect.

Meanwhile, a second lighting device 150 may be further provided in the first door 40 to light the auxiliary storage chamber 50.

As shown in FIG. 5, the second lighting device 150 may be mounted in a groove 42 formed in an inner surface of the frame unit 41 of the first door 40.

The groove 42 may be formed in each side of an inner surface of the frame unit 41 and it may be longitudinally formed.

The second lighting device 150 may be a LED module including a plurality of LEDs.

It is preferred that the second lighting device 150 includes a printed circuit board 152 arranged in the groove 42, a plurality of LEDs vertically arranged on the printed circuit board 152 and a cover member 156 for covering the groove 42.

The second lighting device 150 is operated together with the variable transparency unit 100 and light an inner space of the first door 40, when the variable transparency unit 100 of the second door 30 is getting transparent, such that the auxiliary storage chamber 50 as an internal storage space of the first door 40 may be seen more clearly.

When the second door 30 is open, the hole 43 of the first door 40 is exposed and the LED module 150 may be covered by the cover member 156 to prevent foreign substances from being stuck thereto.

The cover can make an incidence angle of the LED module 150 is toward the auxiliary storage chamber 50 in the first door 40.

When the second lighting device 150 is provided to light the auxiliary storage chamber 50, the power supply unit 170 is connected even to the second lighting device 150.

Accordingly, when operating the variable transparency film 120, the control unit may operate the second lighting device 150 together with the lighting device 190 or only the variable transparency film 120 and the second lighting device 150, not the lighting device 190.

Referring to FIG. 4 again, the second door 30 is the right door and a latch unlock device 36 for selectively unlocking the coupling of the first door 40 to a left front surface.

As shown in FIG. 3, a latch device 44 is mounted in a predetermined portion of the first door 40 and the latch device 44 is selectively coupled to a hook member 34 projected from a back surface of the second door 30.

A push rod 37 of the latch unlocking device 36 is further projected from a back surface of the first door 30 elastically, when a latch unlocking button (35, see FIG. 1) of the second door 30 is pushed.

The push rod 37 pushes the latch rod 47 provided in the first door 30 such that a latch cam (not shown) provided in the latch device 44 is unlocked to rotate.

Accordingly, when the user pulls a handle groove 32 of the second door 30 after pushing the latch unlocking button 35, only the second door 30 is open and the user can approach to the auxiliary storage chamber 50 as the storage space inside the first door 40.

When the user pulls the second door 30 without pressing the latch unlocking button 35, the second door 30 and the first door 40 are rotated together to be open in a coupled state.

Accordingly, the user can store or take out store stored foods after approaching foods.

FIG. 7 is a block diagram schematically illustrating a control unit and elements related with the control unit.

The control unit may control an overall operation of the refrigerator and operations of the variable transparency film 120 and the lighting device 190.

The variable transparency film 120 is getting transparent, when supplied the power and the power supply unit 170 is connected to the variable transparency film 120.

The lighting device 190 provided in the storage chamber of the refrigerator is controlled to be switched on simultaneously, when the door is open and when the power is supplied to be operated.

In other words, when the variable transparency film 120 is operated to be transparent, the power is supplied even to the lighting device 190 simultaneously and the lighting device 190 is operated, regardless of the door opening.

Equal to the embodiment mentioned above, the auxiliary storage chamber 50 is provided in the double structure door and the second lighting device 150 is provided. In this instance, the power has to be supplied even to the second lighting device 150 and the power supply unit 170 has to be connected to the second lighting device 150.

In case the proximity sensor 160 is provided, the control unit 180 may receive a sensing signal from the proximity sensor 160 and operate both of the variable transparency film 120 and the second lighting device 150 based on the sensing signal.

At this time, the control unit 180 controls the power supply unit 170 to supply the voltage which is increasing gradually, such that the variable transparency film 120 can be controlled to get more transparent gradually and the second lighting device 150 can be controlled to be get brighter gradually.

Figure 8A:
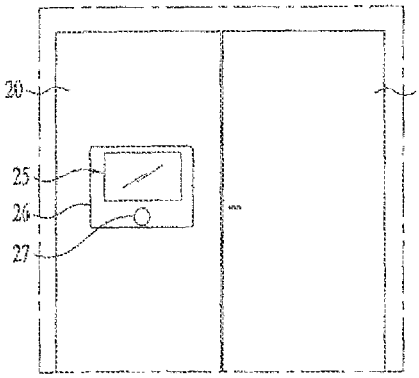
FIGS. 8A to 8C is a front view illustrating that the refrigerator door is gradually getting more transparent and brighter from an opaque state.
Figure 8B:
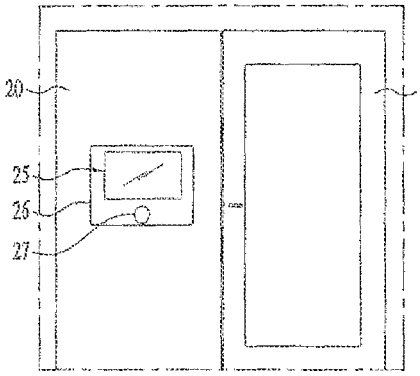
Figure 8C:
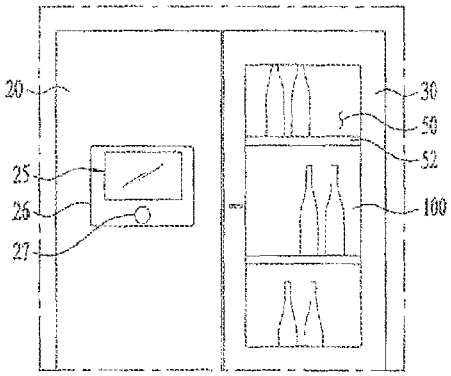

FIGS. 8A to 8C illustrate the refrigerator door which is getting more transparent and brighter gradually from an opaque state.

In FIG. 8A, the right refrigerator door 30 includes the variable transparency unit 100. When the power is not supplied to the variable transparency unit 100, the variable transparency unit 100 is not distinguished from the edge of the second door 30 and it seems that there is no variable transparency unit 100.

When the user approaches the refrigerator door or presses a variable transparency unit operation button, the variable transparency unit 100 is getting more transparent gradually. At this time, the second lighting device 150 is also getting brighter gradually.

Once the variable transparency unit 100 is completely transparent and the second lighting device 150 is the brightest, the inner space of the auxiliary storage chamber 50 provided in the door 30 and the stored foods in the auxiliary storage chamber 50 are seen as shown in FIG. 8C.

When the user is getting farther from the refrigerator door, the variable transparency unit 100 is getting more opaque gradually and the second lighting device 150 is also getting darker gradually into the reverse state from the state shown in FIG. 8C.

The control unit 180 may control whether to operate the variable transparency unit 100 and the second lighting device 150 according to the opening of the second door 30 and the first door 40. A method for controlling the door opening will be described hereinafter.

First of all, when the user approaches the refrigerator, the variable transparency unit 100 and the second lighting device 150 are put into operation to make the auxiliary storage chamber visible.

Once the second door is open, with the first door being closed, the second lighting device 150 is kept being switched on to light the auxiliary storage chamber 50. At this time, the power is not supplied to the variable transparency unit 100 and the variable transparency unit 100 is kept opaque.

When the first door 40 is open, the power supply to the operating variable transparency unit 100 and second lighting device 150 is stopped. At this time, the lighting device 190 provided in the refrigerator compartment is operated.

Moreover, in case the auxiliary storage chamber 50 is accessible when the first door 40 is open, the LED module 150 may keep a switched-on state.

Meanwhile, in case the variable transparency unit 100 is not provided in the double door structure but in the conventional refrigerator door without the auxiliary storage chamber, it is preferred that not only the second lighting device 150 mounted in an open inner space of the door but also the lighting device 190 provided in the refrigerator compartment are operated together when the variable transparency unit 100 is operated.

It is preferred that the second lighting device 150 keeps a switched-on state for lighting a door shelf provided in the door when the refrigerator door is open.

According to the embodiments of the disclosure, the door for opening and closing the storage chamber of the refrigerator is partially transparent and the inner space of the storage chamber provided in the refrigerator may be visible even unless the door is open.

When a particular feature, structure, or characteristic is described in connection with any embodiment, it is submitted that it is within the purview of one skilled in the art to affect such feature, structure, or characteristic in connection with other ones of the embodiments. Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

[1. A method for controlling a refrigerator, the method comprising:

detecting approach of a user to the refrigerator via a proximity sensor; and turning on at least one lighting device inside the refrigerator in response to the detection of the approach of the user to the refrigerator such that an inside of the refrigerator is visible through at least one door of the refrigerator, wherein the refrigerator comprises:

a case having a storage chamber; and the at least one door to open and close the storage chamber, wherein the at least one door includes a first door and a second door rotatably coupled to the case and disposed laterally with respect to each other, the second door comprising:

a frame having a hole defined therethrough, the frame comprising:

a first side surface adjacent to a side surface of the first door; and a second side surface laterally opposite to the first side surface;

a front panel configured to cover the hole of the frame and formed of a transparent material; and an insulation panel formed of a transparent material, the insulation panel being located behind the front panel;

the at least one lighting device configured to illuminate an inner space of the storage chamber;

the proximity sensor which is mounted on the frame and which is configured to detect whether the user is within a predetermined distance from the refrigerator; and at least one processor configured to operate the at least one lighting device to make viewable to the user the inner space of the storage chamber through the hole of the frame when the proximity sensor senses that the user is within the predetermined distance from the refrigerator, and wherein the proximity sensor is located closer to the first side surface of the frame than the second side surface of the frame.]

[2. The method of claim 1, wherein the proximity sensor is configured to be covered by the front panel of the second door.]

[3. The method of claim 1, wherein the proximity sensor is configured to sense a change in capacitance based on the approach of the user to the refrigerator.]

[4. The method of claim 3, wherein the at least one processor is further configured to increase an amount of electric current supplied to the at least one lighting device to increase a brightness level of the at least one lighting device in response to the approach of the user to the refrigerator.]

[5. The method of claim 4, wherein the at least one processor is further configured to control the at least one lighting device to decrease a brightness level of the at least one lighting device as the user moves away from the refrigerator.]

[6. The method of claim 1, further comprising a button configured to receive an input manipulation to activate and deactivate the at least one lighting device.]

[7. The method of claim 1, wherein the at least one lighting device comprises:

a first lighting device disposed inside of the storage chamber; and a second lighting device, wherein a distance between the second lighting device and the second door is smaller than a distance between the first lighting device and the second door.]

[8. The method of claim 7, wherein the at least one processor is configured to operate the second lighting device based on the proximity sensor detecting the approach of the user to the refrigerator.]

[9. The method of claim 8, wherein the second lighting device is configured to illuminate an auxiliary storage chamber of the second door.]

[10. The method of claim 7, further comprising a door switch configured to detect an opening of the first door or the second door, wherein the at least one processor is configured to, based on the door switch detecting the opening of the first door or the second door, simultaneously activate the first lighting device and the second lighting device.]

[11. The method of claim 1, wherein the proximity sensor is disposed on a front side of the frame of the second door which is positioned between the first side surface and a side edge of the hole of the frame.]

12. A method for controlling a refrigerator, the method comprising:

detecting approach of a user to the refrigerator [via] *with* a proximity sensor *of the refrigerator*; and

*based on a first door and a second door of the refrigerator being closed,* turning on [at least one] *a* lighting device [inside] *of* the refrigerator in response to the detection of the approach of the user to the refrigerator such that an inside of the refrigerator is visible through [at least one] *the second* door of the refrigerator, wherein the refrigerator comprises:

a case having a storage chamber[; and],

[the at least one door rotatably coupled to the case and including a first door and a second door, wherein the first door comprises:

a first frame having a first hole, the second door covering the first hole and including:

a second frame having a second hole;

a front panel configured to cover the second hole of the second frame and formed of a transparent material; and an insulation panel formed of a transparent material, the insulation panel being located behind the front panel;

the proximity sensor which is mounted on the second frame and configured to detect whether the user is within a predetermined distance from the refrigerator; and at least one processor configured to operate the at least one lighting device to make viewable to the user the inner space of the storage chamber through the first and second holes of the first and second frames when the proximity sensor senses that the user is within the predetermined distance from the refrigerator, and wherein the proximity sensor is located closer to a first side surface of the second frame than a second side surface of the second frame]

*the lighting device configured to illuminate the storage chamber,*

*the first door configured to open and close the storage chamber, the first door being rotatably coupled to the case and defining a first hole,*

*a door basket coupled to the first door,*

*the second door configured to open and close the first hole, the second door being rotatably coupled to the first door or the case, and*

*a door switch configured to detect whether the first door is open or closed,*

*wherein the second door comprises:*

*a frame having a second hole defined therethrough,*

*a transparent front panel cnofigured to cover the second hole of the frame and having a first color,*

*a transparent insulation panel located in the second hole,*

*an opaque insulation material provided in the frame around the second hole,*

*the proximity sensor configured to detect whether the user is within a predetermined distance from the refrigerator, and*

*a control unit configured to operate the lighting device based on inputs from the proximity sensor and the door switch,*

*wherein the frame comprises:*

*an outer case that defines a front frame, and*

*an inner liner that defines a back surface of the door,*

*wherein the opaque insulation material is filled in a space defined between the outer case and the inner liner, and*

*wherein the transparent front panel overlaps the opaque insulation material in a horizontal direction, and*

*wherein a latch device is provided on one of the first door or the second door, and a hook member con-*

*figured to selectively couple to the latch device is provided on the other of the first door or the second door.*

13. The method of claim 12, wherein the [at least one] lighting device is mounted on the first door.

14. The method of claim 13, wherein the [first] frame comprises a groove and the [at least one] lighting device comprises a plurality of LEDs *that are* arranged in the groove [of the first frame, and a cover arranged to cover the plurality of LEDs] *and covered by a cover.*

15. The method of claim [14] *12*, wherein the first door further comprises a coupling projection to which [a] *the* door basket is coupled, and wherein the [at least one] lighting device is disposed between the coupling projection and the *transparent* insulation panel.

[16. The method of claim 12, wherein a latch is provided on the first door, and a hook selectively coupled to the latch is provided on the second door.]

17. The method of claim 12, [wherein the at least one lighting device is disposed behind the insulation panel] *wherein the second door defines a handle recess configured to be manipulated by the user to open and close the second door, the handle recess being defined at a lower side of the second door.*

18. The method of claim 12, wherein [the refrigerator further comprises a button configured to receive an input manipulation to activate and deactivate the at least one lighting device] *the control unit is configured to activate and deactivate the lighting device based on manual user input at the door.*

[19. A method for controlling a refrigerator, the method comprising:

detecting approach of a user to the refrigerator via a proximity sensor; and turning on at least one lighting device inside the refrigerator in response to the detection of the approach of the user to the refrigerator such that an inside of the refrigerator is visible through at least one door of the refrigerator, wherein the refrigerator comprises:

a case having a storage chamber; and the at least one door to open and close the storage chamber, wherein the at least one door includes a first door and a second door rotatably coupled to the case and disposed laterally with respect to each other, the second door comprising:

a frame having a hole defined therethrough, the frame comprising:

a front panel configured to cover the hole of the frame and formed of a transparent material; and an insulation panel formed of a transparent material, the insulation panel being located behind the front panel;

the at least one lighting device configured to illuminate an inner space of the storage chamber;

the proximity sensor which is mounted on the frame and which is configured to detect whether the user is within a predetermined distance from the refrigerator; and at least one processor configured to operate the at least one lighting device to make viewable to the user the inner space of the storage chamber through the hole of the frame when the proximity sensor senses that the user is within the predetermined distance from the refrigerator, and wherein the proximity sensor is located on the frame behind the insulation panel.]

20. The method of claim [19] *12*, wherein the [at least one] lighting device comprises:

a first lighting device provided inside of the storage chamber; and a second lighting device provided on the first door or the second door,

*wherein the control unit is configured to operate the second lighting device based on the proximity sensor detecting the approach of the user to the refrigerator.*

21. The method of claim [20] *12*, wherein the [at least one processor is configured to operate the second lighting device based on the proximity sensor detecting the approach of the user to the refrigerator] *first door is coupled to the case by a first hinge that is coupled to the case, and the second door is coupled to the first door by a second hinge that is coupled to the first door, and*

*wherein the transparent front panel is configured to shield the first hinge and the second hinge based on the first door and the second door being closed.*

22. The method of claim 20, wherein the proximity sensor is configured to sense a change in capacitance based on the approach of the user to the refrigerator.

*23. The method of claim 12, further comprising a latch unlocking device configured to selectively unlock the coupling between the latch device and the hook member.*

*24. The method of claim 23, further comprising a latch unlocking button provided at the second door to operate the latch unlocking device,*

*wherein a push rod of the latch unlocking device is projected from a back surface of the first door elastically, when a latch unlocking button of the second door is pushed, and*

*wherein the push rod is configured to push a latch rod provided in the first door such that a latch cam provided in the latch device is unlocked to rotate.*

*25. The method of claim 12, wherein the proximity sensor is provided at the second door.*

*26. The method of claim 12, wherein the proximity sensor is installed at the outer case of the second door.*

*27. The method of claim 12, wherein the transparent front panel is configured to cover the proximity sensor.*

*28. The method of claim 12, wherein the transparent front panel is configured to cover a front surface of the outer case.*

*29. The method of claim 12, wherein the transparent insulation panel includes first and second glass panels that are spaced apart from the transparent front panel, and*

*wherein a sealing member is arranged between the first and second glass panels to define an insulation space between the first and second glass panels.*

* * * * *